(12) United States Patent
Matsumoto

(10) Patent No.: US 9,245,692 B2
(45) Date of Patent: Jan. 26, 2016

(54) DYE-SENSITIZED SOLAR CELL

(71) Applicant: FUJIKURA LTD., Tokyo (JP)

(72) Inventor: Daisuke Matsumoto, Sakura (JP)

(73) Assignee: FUJIKURA, LTD., Tokyo (JP)

( * ) Notice: Subject to any disclaimer, the term of this patent is extended or adjusted under 35 U.S.C. 154(b) by 0 days.

(21) Appl. No.: 14/554,820

(22) Filed: Nov. 26, 2014

(65) Prior Publication Data
US 2015/0083219 A1  Mar. 26, 2015

Related U.S. Application Data

(63) Continuation of application No. PCT/JP2013/055101, filed on Feb. 27, 2013.

(30) Foreign Application Priority Data

May 30, 2012  (JP) ................. 2012-123034

(51) Int. Cl.
*H01G 9/20* (2006.01)

(52) U.S. Cl.
CPC .......... *H01G 9/2031* (2013.01); *H01G 9/2027* (2013.01); *H01G 9/20* (2013.01); *H01G 9/2059* (2013.01); *Y02E 10/542* (2013.01)

(58) Field of Classification Search
CPC ... H01G 9/2031; H01G 9/2059; Y02E 10/542
USPC ........................................................ 136/263
See application file for complete search history.

(56) References Cited

U.S. PATENT DOCUMENTS

| 2004/0251508 A1* | 12/2004 | Tomita ................. 257/432 |
| 2006/0174932 A1* | 8/2006 | Usui et al. ............. 136/252 |
| 2006/0219294 A1* | 10/2006 | Yabuuchi et al. ....... 136/263 |

FOREIGN PATENT DOCUMENTS

| JP | 2003-327432 A | 11/2003 |
| JP | 2005-190827 A | 7/2005 |
| JP | 2007-179822 A | 7/2007 |
| JP | 2008-063390 A | 3/2008 |

(Continued)

OTHER PUBLICATIONS

Li et al., "Synergistic effect between anatase and rutile TiO2 nanoparticles in dye-sensitized solar cells", Solar Energy Conversion, Sep. 2009.*

(Continued)

*Primary Examiner* — Matthew Martin
(74) *Attorney, Agent, or Firm* — Sughrue Mion, PLLC

(57) ABSTRACT

Disclosed is a dye-sensitized solar cell which includes a working electrode having a porous titanium oxide layer on a conductive substrate capable of transmitting light, a counter electrode disposed so as to face the working electrode, a photosensitizing dye supported on the porous titanium oxide layer of the working electrode, and an electrolyte disposed between the working electrode and the counter electrode. The porous titanium oxide layer includes a rutile crystal-containing layer containing an anatase crystal-type titanium oxide composed of an anatase crystal and a spherical rutile crystal-type titanium oxide composed of a rutile crystal, and a content of the rutile crystal-type titanium oxide in the rutile crystal-containing layer is from 3 to 15% by mass.

5 Claims, 5 Drawing Sheets

(56) References Cited

FOREIGN PATENT DOCUMENTS

| JP | 2008-115055 A | 5/2008 |
|----|---------------|--------|
| JP | 2010-186922 A | 8/2010 |
| JP | 2012-059388 A | 3/2012 |
| WO | 03/074426 A1  | 9/2003 |

OTHER PUBLICATIONS

Lee et al., "CTAB facilitated spherical rutile TiO2 particles and their advantage in a dye-sensitized solar cell", Solar Energy, 2008.*
International Search Report of PCT/JP2013/055101 dated Apr. 9, 2013 [PCT/ISA/210].

* cited by examiner

DYE-SENSITIZED SOLAR CELL

CROSS REFERENCE TO RELATED APPLICATIONS

This application is a Continuation of National Stage of International Application No. PCT/JP2013/055101 filed Feb. 27, 2013, claiming priority based on Japanese Patent Application No. 2012-123034 filed May 30, 2012, the contents of all of which are incorporated herein by reference in their entirety.

TECHNICAL FIELD

The present invention relates to a dye-sensitized solar cell.

BACKGROUND ART

A dye-sensitized solar cell has been developed by Grätzel of Switzerland and his coworker and is the next-generation solar cell attracting attention since it has advantages such as high photoelectric conversion efficiency and a low production cost.

A dye-sensitized solar cell is generally equipped with a working electrode, a counter electrode, a photosensitizing dye supported on an oxide semiconductor layer of the working electrode, and an electrolyte disposed between the working electrode and the counter electrode.

Further improvement of the photoelectric conversion characteristics is required for such a dye-sensitized solar cell, and thus various investigations have been conducted.

For example, a titanium oxide film electrode film structure of a three-electrode structure is disclosed as a titanium oxide film of a dye-sensitized solar cell in Patent Document 1. In this titanium oxide film electrode film structure of a three-electrode structure, a ground layer in contact with a transparent conductive film on a transparent substrate is constituted by an oxide film consisting of anatase-type crystal granular titanium oxide of fine particles having a diameter of from 5 to 10 nm, an intermediate layer provided on the ground layer is constituted by a porous film containing rutile-type crystal needle-shaped titanium oxide having a diameter of from 30 to 200 nm and a length of from 0.5 to 20 µm and anatase-type crystal granular titanium oxide having a diameter of from 5 to 400 nm, and an uppermost layer provided on the intermediate layer is constituted by a titanium oxide film consisting of anatase-type crystal granular titanium oxide having a diameter of from 20 to 400 nm. It has been designed to achieve high photoelectric conversion efficiency in the dye-sensitized solar cell by using a titanium oxide film having such a structure.

CITATION LIST

Patent Document

Patent Document 1: JP 2008-115055 A

SUMMARY OF THE INVENTION

Problem to be Solved by the Invention

However, the dye-sensitized solar cell disclosed in Patent Document 1 described above has the following problem.

In other words, there is a room for advancement in terms of improving the photoelectric conversion characteristics in the dye-sensitized solar cell described in Patent Document 1 above.

The invention has been achieved in view of the above circumstance, and an object thereof is to provide a dye-sensitized solar cell which can improve the photoelectric conversion characteristics.

Means for Solving Problem

In order to solve the above problem, the present inventor has conducted intensive investigations by focusing on the rutile-type crystal titanium oxide contained in the intermediate layer in the titanium oxide film electrode film structure described in Patent Document 1, and as a result, it has been found that the above problem can be solved when a layer in which the shape of the rutile-type crystal titanium oxide is a specific shape and the content of the rutile-type crystal titanium oxide in the intermediate layer is in a specific range is included in a porous titanium oxide layer, thereby completing the invention.

In other words, the invention is a dye-sensitized solar cell which includes a working electrode having a porous titanium oxide layer on a conductive substrate capable of transmitting light, a counter electrode disposed so as to face the working electrode, a photosensitizing dye supported on the porous titanium oxide layer of the working electrode, and an electrolyte disposed between the working electrode and the counter electrode, in which the porous titanium oxide layer includes a rutile crystal-containing layer containing an anatase crystal-type titanium oxide composed of an anatase crystal and a spherical rutile crystal-type titanium oxide composed of a rutile crystal, and a content of the rutile crystal-type titanium oxide in the rutile crystal-containing layer is from 3 to 15% by mass.

According to this dye-sensitized solar cell, for example, sunlight is transmitted through the conductive substrate of the working electrode and incident on the porous titanium oxide layer. Thereafter, light is incident on the rutile crystal-containing layer in the porous titanium oxide layer. At this time, in the rutile crystal-containing layer, the rutile crystal-type titanium oxide has a higher refractive index than the anatase crystal-type titanium oxide and thus more easily scatters light than the anatase crystal-type titanium oxide. Moreover, the rutile crystal-type titanium oxide has a spherical shape in the invention and thus it is possible to scatter light in various directions compared to the case of having a needle shape and it is possible to evenly spread light to the entire rutile crystal-containing layer. In other words, the rutile crystal-containing layer has a sufficiently high light trapping effect even by itself. On the other hand, the content of the rutile crystal-type titanium oxide in the rutile crystal-containing layer is from 3 to 15% by mass and the remainder is the anatase crystal-type titanium oxide. Here, the photosensitizing dye is more easily adsorbed on the anatase crystal-type titanium oxide than the rutile crystal-type titanium oxide. For this reason, in the rutile crystal-containing layer, it is possible to allow light to be sufficiently absorbed by the photosensitizing dye adsorbed on the anatase crystal-type titanium oxide compared to a case in which the content of the rutile crystal-type titanium oxide in the rutile crystal-containing layer is out of the above range. According to the invention as described above, it is possible to improve the photoelectric conversion characteristics of the dye-sensitized solar cell since the absorption of light and trapping of light are performed with good balance.

It is preferable that an average particle size of the anatase crystal-type titanium oxide in the rutile crystal-containing layer be from 15 to 40 nm.

It is possible to more improve the photoelectric conversion characteristics of the dye-sensitized solar cell when the average particle size of the anatase crystal-type titanium oxide is in the above range since the specific surface area of the anatase crystal-type titanium oxide, on which the photosensitizer dye is more easily adsorbed, increases more compared to the case of exceeding 40 nm. In addition, the leakage current can be more sufficiently diminished when the average particle size of the anatase crystal-type titanium oxide is in the above range since the lattice defect is fewer (that is, crystallinity is higher) compared to the case of being less than 15 nm.

In the dye-sensitized solar cell, it is preferable that an average particle size of the rutile crystal-type titanium oxide in the rutile crystal-containing layer be from 50 to 500 nm.

The light trapping effect in the porous titanium oxide layer is more increased when the average particle size of the rutile crystal-type titanium oxide is in the above range compared to the case of being out of the above range, and thus it is possible to more improve the photoelectric conversion characteristics of the dye-sensitized solar cell.

In the dye-sensitized solar cell, it is preferable that the porous titanium oxide layer have a first layer and a second layer provided on a conductive substrate side with respect to the first layer, the first layer be constituted by the rutile crystal-containing layer, and a content of the rutile crystal-type titanium oxide in the second layer be smaller than a content of the rutile crystal-type titanium oxide in the first layer.

In this case, it is possible to allow light to be more sufficiently absorbed in the second layer since the content of the rutile crystal-type titanium oxide is smaller in the second layer than the first layer. In addition, it is possible to more sufficiently reflect the light, which is transmitted through the second layer and incident on the first layer, by the rutile crystal-type titanium oxide contained more in the first layer contained than in the second layer. For this reason, the absorption of light is more sufficiently performed as well as the light trapping effect is more increased compared to a case in which the content of the rutile crystal-type titanium oxide in the second layer is equal to or more than the content of the rutile crystal-type titanium oxide in the first layer. As a result, it is possible to more improve the photoelectric conversion characteristics of the dye-sensitized solar cell.

In the dye-sensitized solar cell, it is preferable that the porous titanium oxide layer further have a light reflecting layer to reflect the light emitted from the rutile crystal-containing layer on a side opposite to the conductive substrate with respect to the rutile crystal-containing layer.

In this case, even when light is transmitted through the rutile crystal-containing layer, the light is reflected by the light reflecting layer and thus returned to the rutile crystal-containing layer. For this reason, the efficiency of light absorption in the porous titanium oxide layer increases more compared to a case in which the porous titanium oxide layer does not have a light reflecting layer, and thus it is possible to more improve the photoelectric conversion characteristics of the dye-sensitized solar cell.

In the dye-sensitized solar cell, it is preferable that the light reflecting layer include a rutile crystal-type titanium oxide composed of a rutile crystal.

In this case, it is possible to more sufficiently scatter light compared to a case in which the light reflecting layer does not contain a rutile crystal-type titanium oxide, and the efficiency of light absorption in the porous titanium oxide layer more increases, and thus it is possible to more improve the photoelectric conversion characteristics of the dye-sensitized solar cell.

In the dye-sensitized solar cell, it is preferable that the rutile crystal-containing layer be disposed at a position closest to the counter electrode in the porous titanium oxide layer, the electrolyte be constituted by a gel electrolyte containing a rutile crystal-type titanium oxide composed of a rutile crystal, and a haze ratio of the electrolyte be greater than a haze ratio of the porous titanium oxide layer.

In this case, the light transmitted through the rutile crystal-containing layer is effectively reflected by the electrolyte and sufficiently returned to the rutile crystal-containing layer since the haze ratio of the electrolyte is greater than the haze ratio of the porous titanium oxide layer. For this reason, the efficiency of light absorption in the porous titanium oxide layer increases more compared to a case in which the haze ratio of the electrolyte is equal to or less than the haze ratio of the porous titanium oxide layer, and thus it is possible to more improve the photoelectric conversion characteristics of the dye-sensitized solar cell. In addition, it is possible to more sufficiently scatter light compared to a case in which the electrolyte does not contain a rutile crystal-type titanium oxide, and the efficiency of light absorption in the porous titanium oxide layer more increases, and thus it is possible to more improve the photoelectric conversion characteristics of the dye-sensitized solar cell. Furthermore, the fluidity of the electrolyte is sufficiently deteriorated since the electrolyte is constituted by a gel electrolyte. For this reason, it is possible to sufficiently suppress that the rutile crystal-type titanium oxide is unevenly distributed in the electrolyte even in a case in which the dye-sensitized solar cell is installed such that the conductive substrate is inclined with respect to the horizontal plane unlike the case in which the electrolyte is liquid, and thus it is possible to evenly reflect the light transmitted through the porous titanium oxide layer.

Meanwhile, in the invention, the average particle size of the rutile crystal-type titanium oxide refers to the average particle size measured by an X-ray diffraction apparatus (XRD, SmartLab, a fully automatic horizontal multi-purpose X-ray diffractometer manufactured by Rigaku Corporation) in a case in which the average particle size is from 1 to 100 nm, and it refers to the average particle size measured by a scanning electron microscope (SEM) in a case in which the average particle size exceeds 100 nm. Here, the average particle size measured by an SEM refers to the average value of the particle sizes calculated for the rutile crystal-type titanium oxide observed by an SEM based on the following Equation.

$$\text{Particle size} = (S/\pi)^{1/2}$$

(In Equation above, S represents the area of the rutile crystal-type titanium oxide)

In addition, the term "spherical shape" refers to the shape in which the ratio of the maximum diameter to the minimum diameter of the rutile crystal-type titanium oxide is 1 or more and 1.75 or less in the case of observing the porous titanium oxide layer by an SEM.

Moreover, in the invention, the term "haze ratio" refers to the average value of the haze ratios in the wavelength region of from 400 to 1000 nm Furthermore, in the invention, the term "gel electrolyte" refers to an electrolyte in a state in which the viscosity is lost. Specifically, an electrolyte is defined as a gel electrolyte if all the electrolyte does not fall from the glass tube in 15 minutes when 10 cc of the electrolyte is introduced into a cylindrical glass tube having an inner diameter of 15 mm and a depth of 10 cm and left to stand in the inverted glass tube at room temperature (23° C.)

Effect of the Invention

According to the invention, a dye-sensitized solar cell which can improve the photoelectric conversion characteristic is provided.

MODE(S) FOR CARRYING OUT THE INVENTION

Figure 1:
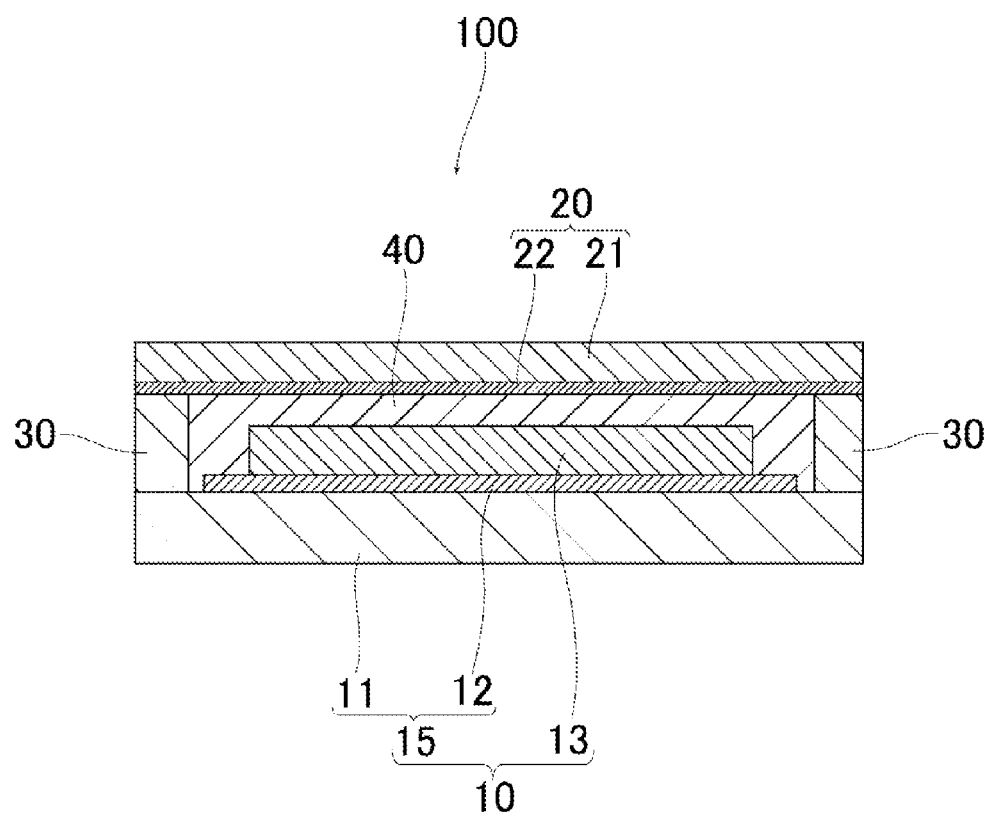
FIG. 1 is a cross-sectional view illustrating a first embodiment of a dye-sensitized solar cell of the invention.

Hereinafter, embodiments of the invention will be described in detail with reference to the accompanying drawings. Meanwhile, the same reference numerals are given to the same or equivalent components in all of the figures, and redundant description is omitted.

First Embodiment

First of all, a first embodiment of the dye-sensitized solar cell of the invention will be described using FIG. 1 and FIG. 2.

Figure 2:
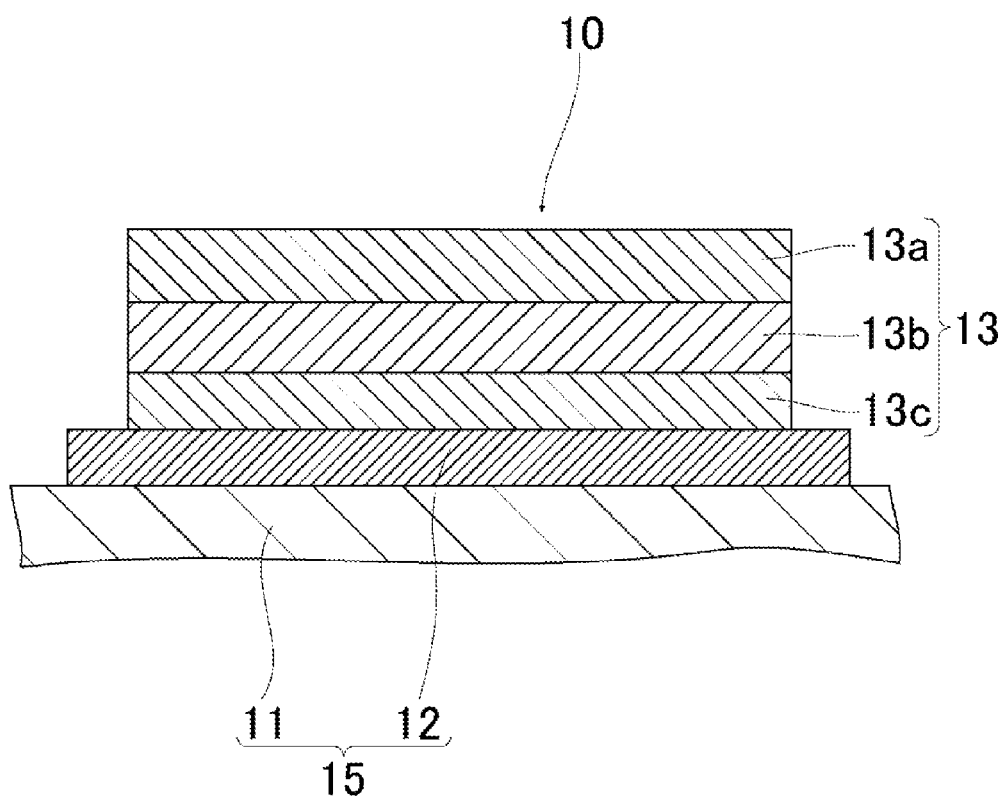
FIG. 2 is a partially enlarged cross-sectional view illustrating a working electrode in FIG. 1.

FIG. 1 is a cross-sectional view illustrating a first embodiment of a dye-sensitized solar cell according to the invention, and FIG. 2 is a partially enlarged cross-sectional view illustrating a working electrode in FIG. 1.

As illustrated in FIG. 1, a dye-sensitized solar cell 100 is equipped with a working electrode 10 having a porous titanium oxide layer 13 containing titanium oxide, a counter electrode 20 disposed so as to face the working electrode 10, a photosensitizing dye supported on the porous titanium oxide layer 13 of the working electrode 10, a sealing portion 30 connecting the working electrode 10 and the counter electrode 20, and an electrolyte 40 disposed between the working electrode 10 and the counter electrode 20.

The working electrode 10 has the porous titanium oxide layer 13 on a conductive substrate 15 capable of transmitting light. The conductive substrate 15 has a transparent substrate 11 and a transparent conductive film 12 which is provided on a side of the transparent substrate 11 facing the counter electrode 20. The electrolyte 40 is impregnated also into the porous titanium oxide layer 13. The counter electrode 20 is equipped with a counter electrode substrate 21 and a conductive catalyst layer 22 which is provided on a side of the counter electrode substrate 21 facing the working electrode 10 and which promotes the reduction reaction on the surface of the counter electrode 20.

As illustrated in FIG. 2, the porous titanium oxide layer 13 is constituted by a three-layer laminate. Specifically, the porous titanium oxide layer 13 is constituted by a first layer 13b, a second layer 13c which is provided on the conductive substrate 15 side with respect to the first layer 13b and contains an anatase crystal-type titanium oxide, and a light reflecting layer 13a which reflects light emitted from the first layer 13b positioned on the side opposite to the conductive substrate 15 with respect to the first layer 13b. Here, the first layer 13b and the second layer 13c function as a light absorbing layer to allow light to be absorbed by the photosensitizing dye.

The first layer 13b is constituted by a rutile crystal-containing layer containing an anatase crystal-type titanium oxide composed of an anatase crystal and a spherical rutile crystal-type titanium oxide composed of a rutile crystal. In addition, the content of the rutile crystal-type titanium oxide in the first layer 13b is from 3 to 15% by mass.

The content of the rutile crystal-type titanium oxide in the second layer 13c is smaller than the content of the rutile crystal-type titanium oxide in the first layer 13b.

On the other hand, the light reflecting layer 13a contains a rutile crystal-type titanium oxide, and the content of the rutile crystal-type titanium oxide in the light reflecting layer 13a is greater than the content of the rutile crystal-type titanium oxide in the first layer 13b.

Hence, in the porous titanium oxide layer 13, the content of the rutile crystal-type titanium oxide in the layer increases as the distance from the conductive substrate 15 increases. On the contrary, the content of the anatase crystal-type titanium oxide in the layer decreases as the distance from the conductive substrate 15 increases.

According to the dye-sensitized solar cell 100 described above, for example, sunlight is transmitted through the conductive substrate 15 of the working electrode 10 and incident on the porous titanium oxide layer 13. Thereafter, the light is incident on the first layer 13b that is the rutile crystal-containing layer in the porous titanium oxide layer 13. At this time, in the first layer 13b, the rutile crystal-type titanium oxide has a higher refractive index than the anatase crystal-type titanium oxide and thus more easily scatters light than the anatase crystal-type titanium oxide. Moreover, the rutile crystal-type titanium oxide has a spherical shape and thus it is possible to scatter light in various directions compared to the case of having a needle shape and it is possible to evenly spread light to the entire first layer 13b. In other words, the first layer 13b has a sufficiently high light trapping effect even by itself. On the other hand, the content of the rutile crystal-type titanium oxide in the first layer 13b is from 3 to 15% by mass and the remainder is the anatase crystal-type titanium oxide. Here, the photosensitizing dye is more easily adsorbed on the anatase crystal-type titanium oxide than the rutile crystal-type titanium oxide. For this reason, in the first layer 13b, it is possible to allow light to be sufficiently absorbed by the photosensitizing dye adsorbed on the anatase crystal-type titanium oxide compared to a case in which the content of the rutile crystal-type titanium oxide in the first layer 13b is out of the above range. According to the dye-sensitized solar cell 100 as described above, it is possible to improve the photoelectric conversion characteristics of the dye-sensitized solar cell 100 since the absorption of light and trapping of light are performed with good balance.

In addition, in the dye-sensitized solar cell 100, the porous titanium oxide layer 13 has the second layer 13c, in which the content of the rutile crystal-type titanium oxide is smaller than the content of the rutile crystal-type titanium oxide in the first layer 13b, on the conductive substrate 15 side with respect to the first layer 13b. For this reason, the following effect is obtained. In other words, the content of the rutile crystal-type titanium oxide in the second layer 13c is smaller than the content of the rutile crystal-type titanium oxide in the first layer 13b and thus it is possible to allow light to be more sufficiently absorbed in the second layer 13c. In addition, the light, which is transmitted through the second layer 13c and incident on the first layer 13b, can be more sufficiently reflected by the rutile crystal-type titanium oxide contained more in the first layer 13b contained than in the second layer 13c. For this reason, the absorption of light is more sufficiently performed as well as the light trapping effect is more increased compared to a case in which the content of the rutile crystal-type titanium oxide in the second layer 13c is equal to or more than the content of the rutile crystal-type titanium oxide in the first layer 13b. As a result, it is possible to more improve the photoelectric conversion characteristics of the dye-sensitized solar cell 100.

Moreover, in the dye-sensitized solar cell 100, the porous titanium oxide layer 13 further has the light reflecting layer 13a which reflects light emitted from the first layer 13b on the side opposite to the conductive substrate 15 with respect to the first layer 13b. For this reason, the following effect is obtained. In other words, even when light is transmitted through the first layer 13b, the light is reflected by the light reflecting layer 13a and thus returned to the first layer 13b. For this reason, the efficiency of light absorption in the porous titanium oxide layer 13 increases more compared to a case in which the porous titanium oxide layer 13 does not have a light reflecting layer 13a, and thus it is possible to more improve the photoelectric conversion characteristics of the dye-sensitized solar cell 100.

Next, the working electrode 10, the photosensitizing dye, the counter electrode 20, the sealing portion 30, and the electrolyte 40 will be described in detail.

(Working Electrode)

As described above, the working electrode 10 is equipped with the conductive substrate 15 capable of transmitting light and the porous titanium oxide layer 13 provided on the conductive substrate 15. The conductive substrate 15 has the transparent substrate 11 and the transparent conductive film 12 which is provided on the side of the transparent substrate 11 facing the counter electrode 20 (see FIG. 1).

The material constituting the transparent substrate 11 may be any transparent material, for example, and examples of such a transparent material may include glass such as borosilicate glass, soda lime glass, glass which is made of soda lime and whose iron component is less than that of ordinary soda lime glass, and quartz glass, polyethylene terephthalate (PET), polyethylene naphthalate (PEN), polycarbonate (PC), and polyethersulfone (PES). The thickness of the transparent substrate 11 is appropriately determined depending on the size of the dye-sensitized solar cell 100 and is not particularly limited, but it may be set in the range of from 50 to 10000 μm, for example.

Examples of the material constituting the transparent conductive film 12 include a conductive metal oxide such as tin-doped indium oxide (ITO), tin oxide ($SnO_2$), and fluorine-doped tin oxide (FTO). Among them, it is preferable that the transparent conductive film 12 be constituted by FTO since FTO has high heat resistance and chemical resistance. The thickness of the transparent conductive film 12 may be set in the range of from 0.01 to 2 μm, for example.

[First Layer]

The first layer 13b may include an anatase crystal-type titanium oxide and a spherical rutile crystal-type titanium oxide.

Here, the anatase crystal-type titanium oxide may be constituted by only an anatase crystal-type titanium oxide for light absorption to allow light to be absorbed by the photosensitizing dye or may be constituted by an anatase crystal-type titanium oxide for light absorption and an anatase crystal-type titanium oxide for light scatter to scatter light. However, it is preferable that the anatase crystal-type titanium oxide be constituted by only an anatase crystal-type titanium oxide for light absorption. In this case, it is possible to more improve the photoelectric conversion characteristics of the dye-sensitized solar cell 100.

The average particle size of the anatase crystal-type titanium oxide in the first layer 13b is usually from 10 to 60 nm but preferably from 15 to 40 nm.

The specific surface area of the anatase crystal-type titanium oxide, on which the photosensitizer dye is more easily adsorbed, more increases when the average particle size of the anatase crystal-type titanium oxide is in the range of from 15 to 40 nm compared to the case of exceeding 40 nm, and thus it is possible to more improve the photoelectric conversion characteristics of the dye-sensitized solar cell 100. In addition, the leakage current can be more sufficiently diminished when the average particle size of the anatase crystal-type titanium oxide is in the above range since the lattice defect is fewer (that is, crystallinity is higher) compared to the case of being less than 15 nm.

The average particle size of the anatase crystal-type titanium oxide is more preferably from 17 to 30 nm.

The average particle size of the rutile crystal-type titanium oxide is usually from 40 to 700 nm but preferably from 50 to 500 nm.

The light trapping effect in the porous titanium oxide layer 13 is more sufficient when the average particle size of the rutile crystal-type titanium oxide is in the range of from 50 to 500 nm compared to the case of being out of the above range, and thus it is possible to more improve the photoelectric conversion characteristics of the dye-sensitized solar cell 100.

The average particle size of the rutile crystal-type titanium oxide is more preferably from 80 to 400 nm and particularly preferably from 100 to 300 nm.

The content of the rutile crystal-type titanium oxide in the first layer 13b is from 3 to 15% by mass and more preferably from 3 to 10% by mass.

The content difference between the content of the rutile crystal-type titanium oxide in the first layer 13b and the content of the rutile crystal-type titanium oxide in the light reflecting layer 13a is preferably more than 0% by mass and more preferably from 85 to 97% by mass. In this case, higher power generation characteristics can be obtained compared to a case in which the above content difference is out of the above range.

The thickness of the first layer 13b is not particularly limited but is usually from 1 to 40 μm and preferably from 4 to 25 μm.

[Second Layer]

Second layer 13c may contain an anatase crystal-type titanium oxide. Hence, the second layer 13c may be constituted by only an anatase crystal-type titanium oxide or may be constituted by an anatase crystal-type titanium oxide and a rutile crystal-type titanium oxide. However, in the present embodiment, the content of the rutile crystal-type titanium oxide in the second layer 13c is smaller than the content of the rutile crystal-type titanium oxide in the first layer 13b.

The content difference between the content of the rutile crystal-type titanium oxide in the second layer 13c and the content of the rutile crystal-type titanium oxide in the first layer 13b is not particularly limited but is preferably more than 0% by mass and 50% by mass or less. In this case, higher power generation characteristics can be obtained compared to a case in which the above content difference is out of the above range.

It is preferable that the second layer 13c do not contain a rutile crystal-type titanium oxide. In other words, the content of the rutile crystal-type titanium oxide in the second layer 13c is preferably 0% by mass. In this case, it is possible to allow light to be more sufficiently absorbed in the porous titanium oxide layer 13 compared to a case in which the second layer 13c contains a rutile crystal-type titanium oxide, and thus it is possible to more improve the photoelectric conversion characteristics of the dye-sensitized solar cell 100.

The anatase crystal-type titanium oxide in the second layer 13c may be constituted by only an anatase crystal-type titanium oxide for light absorption or may be constituted by an anatase crystal-type titanium oxide for light absorption and an anatase crystal-type titanium oxide for light scatter in the same manner as the first layer 13b. However, it is preferable that the anatase crystal-type titanium oxide be constituted by only an anatase crystal-type titanium oxide for light absorption. In this case, it is possible to more improve the photoelectric conversion characteristics of the dye-sensitized solar cell 100.

The shape of the rutile crystal-type titanium oxide and the anatase crystal-type titanium oxide contained in the second layer 13c is not particularly limited, and examples thereof may include a spherical shape and a needle shape. It is preferable that particularly the rutile crystal-type titanium oxide have a spherical shape in the same manner as the rutile crystal-type titanium oxide in the first layer 13b. In this case, the effect of scattering light incident on the porous titanium oxide layer 13 increases more compared to a case in which the rutile crystal-type titanium oxide has a shape other than the spherical shape, and thus it is possible to more improve the photoelectric conversion characteristics of the dye-sensitized solar cell 100.

The thickness of the second layer 13c is not particularly limited but is usually from 1 to 40 μm and preferably from 4 to 25 μm.

[Light Reflecting Layer]

In the present embodiment, the content of the rutile crystal-type titanium oxide in the light reflecting layer 13a is not particularly limited as long as it is greater than the content of the rutile crystal-type titanium oxide in the first layer 13b, but it is preferably from 70 to 100% by mass. In this case, the light trapping effect is more increased compared to a case in which the content of the rutile crystal-type titanium oxide in the light reflecting layer 13a is out of the above range. In addition, the following advantage is also obtained. In other words, first, the contact area of the light reflecting layer 13a with the electrolyte 40 is greater compared to those of the first layer 13b and the second layer 13c with the electrolyte 40. For this reason, there is a tendency that the leakage current from the photosensitizing dye into the electrolyte 40 easily increases. With regard to that point, the photosensitizing dye is almost not supported on the rutile crystal-type titanium oxide when the content of the rutile crystal-type titanium oxide in the light reflecting layer 13a is from 70 to 100% by mass, and thus the photosensitizing dye that functions as a leakage current site more decreases. For this reason, there is a tendency that the photoelectric conversion characteristics of the dye-sensitized solar cell 100 can be more improved compared to a case in which the content of the rutile crystal-type titanium oxide in the light reflecting layer 13a is out of the above range. Meanwhile, the rest of titanium oxide contained in the light reflecting layer 13a is an anatase crystal-type titanium oxide in a case in which the content of the rutile crystal-type titanium oxide in the light reflecting layer 13a is less than 100% by mass.

The content of the rutile crystal-type titanium oxide in the light reflecting layer 13a is more preferably from 80 to 100% by mass and particularly preferably 100% by mass.

The shape of the rutile crystal-type titanium oxide and the anatase crystal-type titanium oxide contained in the light reflecting layer 13a is not particularly limited, and examples thereof may include a spherical shape and a needle shape. It is preferable that particularly the rutile crystal-type titanium oxide have a spherical shape in the same manner as the rutile crystal-type titanium oxide in the first layer 13b. In this case, the effect of scattering light incident on the porous titanium oxide layer 13 increases more compared to a case in which the rutile crystal-type titanium oxide has a shape other than the spherical shape, and thus it is possible to more improve the photoelectric conversion characteristics of the dye-sensitized solar cell 100.

The average particle size of the rutile crystal-type titanium oxide may be set to be the same as the average particle size of the rutile crystal-type titanium oxide in the first layer 13b, for example.

The thickness of the light reflecting layer 13a is not particularly limited but is usually from 1 to 15 μm and preferably from 2 to 8 μm.

The content of the rutile crystal-type titanium oxide in the entire porous titanium oxide layer 13 is not particularly limited but is preferably from 3 to 40% by mass and more preferably from 10 to 35% by mass.

It is possible to more improve the photoelectric conversion characteristics of the dye-sensitized solar cell 100 when the content of the rutile crystal-type titanium oxide in the entire porous titanium oxide layer 13 is from 10 to 35% by mass compared to the case of being out of the above range.

The thickness of the porous titanium oxide layer 13 is not particularly limited and may be set to from 0.5 to 50 μm, for example.

(Photosensitizing Dye)

Examples of the photosensitizing dye may include a ruthenium complex having a ligand containing a bipyridine structure or a terpyridine structure, or an organic dye such as porphyrin, eosin, rhodamine, and merocyanine. Among them, a ruthenium complex having a ligand containing a terpyridine structure is preferable. In this case, it is possible to more improve the photoelectric conversion characteristics of the dye-sensitized solar cell 100.

Meanwhile, it is preferable to use a ruthenium complex having a ligand containing a bipyridine structure as the photosensitizing dye in a case in which the dye-sensitized solar cell 100 is used indoor or in an environment having a low illumination intensity (10 to 10000 lux).

(Counter Electrode)

As described above, the counter electrode 20 is equipped with a counter electrode substrate 21 and a conductive catalyst layer 22 which is provided on the side of the counter electrode substrate 21 facing the working electrode 10 and which promotes the reduction reaction on the surface of the counter electrode 20.

The counter electrode substrate 21 is constituted by, for example, a corrosion-resistant metallic material such as titanium, nickel, platinum, molybdenum, tungsten, and SUS or a substrate obtained by forming a film composed of a conductive oxide such as ITO and FTO on the transparent substrate 11 described above. The thickness of the counter electrode substrate 21 is appropriately determined depending on the size of the dye-sensitized solar cell 100 and is not particularly limited, but the thickness may be set to from 0.005 to 0.1 mm, for example.

The catalyst layer 22 is constituted by platinum, a carbon-based material, a conductive polymer or the like. Here, examples of the carbon-based material may include carbon black, ketjen black, and carbon nanotubes, and carbon nanotubes are particularly suitably used among them.

(Sealing Portion)

Examples of the material constituting the sealing portion 30 may include an inorganic insulating material such as a non-lead-based transparent glass frit having a low melting point or a resin such as various kinds of modified polyolefin resins including an ionomer, an ethylene-vinyl acetic anhydride copolymer, an ethylene-methacrylic acid copolymer, an ethylene-vinyl alcohol copolymer and the like, an ultraviolet curing resin, and vinyl alcohol polymer. Meanwhile, the sealing portion 30 may be constituted by only a resin or may be constituted by a resin and an inorganic filler.

(Electrolyte)

The electrolyte 40 contains, for example, a redox couple such as $I^-/I_3^-$ and an organic solvent. It is possible to use acetonitrile, methoxy acetonitrile, methoxy propionitrile, propionitrile, ethylene carbonate, propylene carbonate, diethyl carbonate, γ-butyrolactone, valeronitrile, pivalonitrile, glutaronitrile, methacrylonitrile, isobutyronitrile, phenyl acetonitrile, acrylonitrile, succinonitrile, oxalonitrile, pentanenitrile, and adiponitrile as the organic solvent. Examples of the redox couple may include a redox couple such as bromine/bromide ion, a zinc complex, an iron complex, and a cobalt complex in addition to $I^-/I_3^-$. In addition, the electrolyte 40 may use an ionic liquid instead of the organic solvent. As the ionic liquid, it is possible to use, for example, an ordinary temperature molten salt which is a known iodine salt, such as a pyridinium salt, an imidazolium salt, and a triazolium salt, and which is in a molten state at around room temperature. As such an ordinary temperature molten salt, it is possible to suitably use, for example, 1-hexyl-3-methylimidazolium iodide, 1-ethyl-3-propylimidazolium iodide, dimethylimidazolium iodide, ethylmethylimidazolium iodide, dimethylpropylimidazolium iodide, butylmethylimidazolium iodide, or methylpropylimidazolium iodide.

In addition, the electrolyte 40 may use a mixture of the ionic liquid above and the organic solvent above instead of the organic solvent above.

In addition, it is possible to add an additive to the electrolyte 40. Examples of the additive may include LiI, $I_2$, 4-t-butylpyridine, guanidinium thiocyanate, 1-methylbenzimidazole, and 1-butylbenzimidazole.

Moreover, as the electrolyte 40, a nanocomposite gel electrolyte of a quasi-solid electrolyte which is obtained by kneading nanoparticles such as $SiO_2$, $TiO_2$, and carbon nanotubes with the electrolyte above to form a gel-like form may be used, or an electrolyte gelled using an organic gelling agent such as polyvinylidene fluoride, a polyethylene oxide derivative, and an amino acid derivative may also be used.

Next, the method of manufacturing the dye-sensitized solar cell 100 will be described.

<Working Electrode Preparing Process>

First, the working electrode 10 is prepared in the following manner.

At the beginning, the transparent conductive film 12 is formed on the transparent substrate 11, and thus the conductive substrate 15 exhibiting transparency is prepared. As the method of forming the transparent conductive film 12, a sputtering method, a vapor deposition method, a spray pyrolysis deposition method (SPD), a CVD method or the like is used.

(Porous Titanium Oxide Layer Forming Process)

Next, a second layer forming paste for forming the second layer 13c is printed on the transparent conductive film 12. The second layer forming paste contains a resin such as polyethylene glycol, and ethylcellulose and a solvent such as terpineol in addition to titanium oxide. Titanium oxide contained in the second layer forming paste contains an anatase crystal-type titanium oxide and a rutile crystal-type titanium oxide if necessary. The content of the rutile crystal-type titanium oxide in the entire titanium oxide is set to be the same as the content of the rutile crystal-type titanium oxide in the second layer 13c.

Next, the above second layer forming paste is dried, and a first layer forming paste for forming the first layer 13b is printed thereon. The first layer forming paste contains a resin such as polyethylene glycol, and ethylcellulose and a solvent such as terpineol in addition to titanium oxide. Titanium oxide contains an anatase crystal-type titanium oxide and a spherical rutile crystal-type titanium oxide. The content of the rutile crystal-type titanium oxide in the entire titanium oxide contained in the first layer forming paste is set to be the same as the content of the rutile crystal-type titanium oxide in the first layer 13b. In other words, the content of the rutile crystal-type titanium oxide in the entire titanium oxide contained in the first layer forming paste is set to be from 3 to 15% by mass. In addition, in the present embodiment, the content of the rutile crystal-type titanium oxide in the entire titanium oxide is set to be greater than the content of the rutile crystal-type titanium oxide in the titanium oxide contained in the second layer forming paste.

Next, the above first layer forming paste is dried, and a light reflecting layer forming paste is printed thereon. The light reflecting layer forming paste contains a resin such as polyethylene glycol, and ethylcellulose and a solvent such as terpineol in addition to titanium oxide. Titanium oxide contains a rutile crystal-type titanium oxide and an anatase crystal-type titanium oxide if necessary. The content of the rutile crystal-type titanium oxide in the entire titanium oxide contained in the light reflecting layer forming paste is set to be the same as the content of the rutile crystal-type titanium oxide in the light reflecting layer 13a. At this time, the content of the rutile crystal-type titanium oxide in the entire titanium oxide contained in the light reflecting layer forming paste is set to be greater than the content of the rutile crystal-type titanium oxide in the titanium oxide contained in the first layer forming paste.

As the printing method of the second layer forming paste, the first layer forming paste, and the light reflecting layer forming paste, it is possible to use, for example, a screen printing method, a doctor blade method, or a bar coating method.

Finally, the second layer forming paste, the first layer forming paste, and the light reflecting layer forming paste are collectively fired to form the porous titanium oxide layer 13 on the transparent conductive film 12. The firing temperature varies depending on the material of the oxide semiconductor particles but is usually from 350 to 600° C., and the firing time also varies depending on the material of the oxide semiconductor particles but is usually from 1 to 5 hours. Meanwhile, it is also possible that the first layer forming paste is printed after firing the second layer forming paste, the light reflecting layer forming paste is printed after firing the first layer forming paste, and finally the light reflecting layer forming paste is fired instead of firing the second layer forming paste, the first layer forming paste, and the light reflecting layer forming paste collectively.

The working electrode 10 is obtained in this manner.

<Dye Supporting Process>

Next, a photosensitizing dye is supported on the porous titanium oxide layer 13 of the working electrode 10. For this, a photosensitizing dye may be adsorbed on the porous titanium oxide layer 13 by immersing the working electrode 10 in a solution containing the photosensitizing dye, the extra photosensitizing dye is then washed out with the solvent component of the above solution, and drying is performed, and thus the photosensitizing dye may be adsorbed on the porous titanium oxide layer 13. However, it is also possible to support the photosensitizing dye on the porous titanium oxide layer 13 by coating a solution containing the photosensitizer dye on the porous titanium oxide layer 13 and then drying to adsorb the photosensitizing dye on the porous titanium oxide layer 13.

<Counter Substrate Preparing Process>

On the other hand, the counter electrode 20 is prepared in the following manner.

First, the counter electrode substrate 21 is prepared. The catalyst layer 22 is then formed on the counter electrode substrate 21. A sputtering method, a screen printing method, a vapor deposition method or the like is used as the method of forming the catalyst layer 22. The sputtering method is preferable in terms of the uniformity of the film among these.

<Resin Sheet Fixing Process>

Next, for example, an annular sheet formed of a thermoplastic resin is prepared. This sheet is then placed on the working electrode 10 having the porous titanium oxide layer 13 which supports the photosensitizing dye and heated to melt. At this time, the porous titanium oxide layer 13 is disposed on the inner side of the annular sheet. The annular resin sheet is fixed on the surface of the working electrode 10 in this manner.

<Electrolyte Disposing Process>

Thereafter, the electrolyte 40 is prepared. The electrolyte 40 is then placed on the inner side of the annular resin sheet fixed on the working electrode 10. It is possible to dispose the electrolyte 40, for example, by a printing method such as screen printing.

<Sealing Process>

After the electrolyte 40 is disposed on the working electrode 10, the counter electrode 20 is superimposed on the working electrode 10 so as to sandwich the electrolyte 40 between the counter electrode 20 and the working electrode 10, and an annular resin sheet is melted by heating to adhere the counter electrode 20 to the working electrode 10. The dye-sensitized solar cell 100 having the sealing portion 30 between the working electrode 10 and the counter electrode 20 is obtained in this manner, thereby completing the manufacture of the dye-sensitized solar cell 100.

Meanwhile, the preparation of the counter electrode 20 may be performed before bonding of the counter electrode 20 with the working electrode 10. Hence, the preparation of the counter electrode 20 may be performed after the electrolyte 40 is disposed on the working electrode 10 and before the counter electrode 20 is bonded with the working electrode 10 in a case in which the electrolyte 40 is disposed on the working electrode 10. However, the preparation of the working electrode 10 may be performed after the electrolyte 40 is disposed on the counter electrode 20 and before the counter electrode 20 is bonded with the working electrode 10 in a case in which the electrolyte 40 is disposed on the counter electrode 20.

Second Embodiment

Next, the second embodiment of the dye-sensitized solar cell of the invention will be described using FIG. 3 and FIG. 4.

Figure 3:
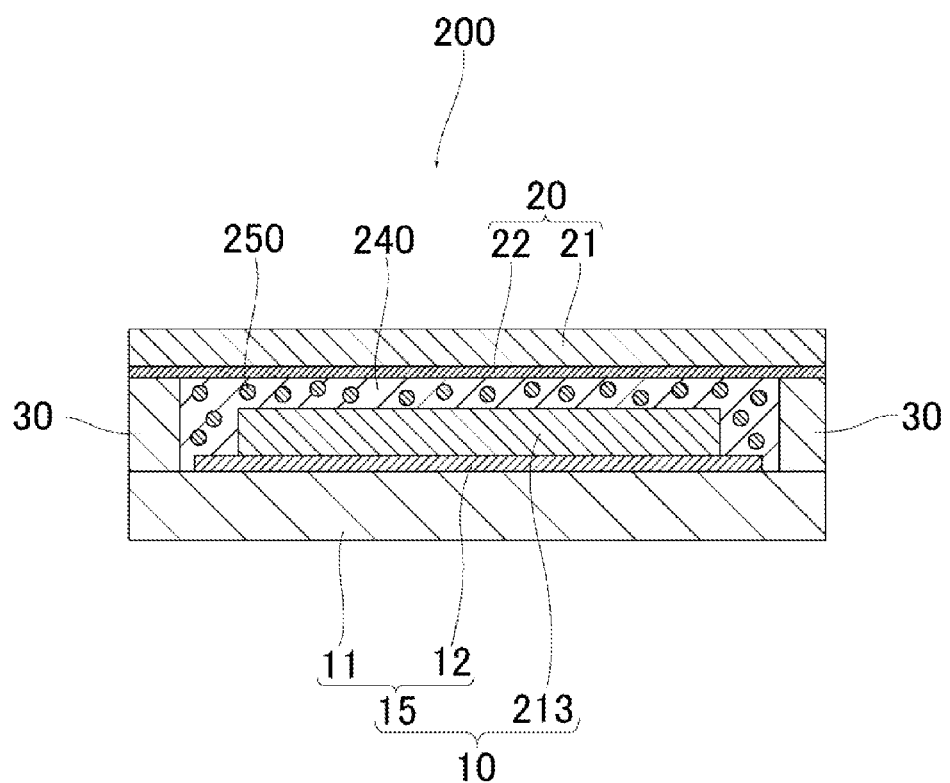
FIG. 3 is a cross-sectional view illustrating a second embodiment of a dye-sensitized solar cell of the invention.
Figure 4:
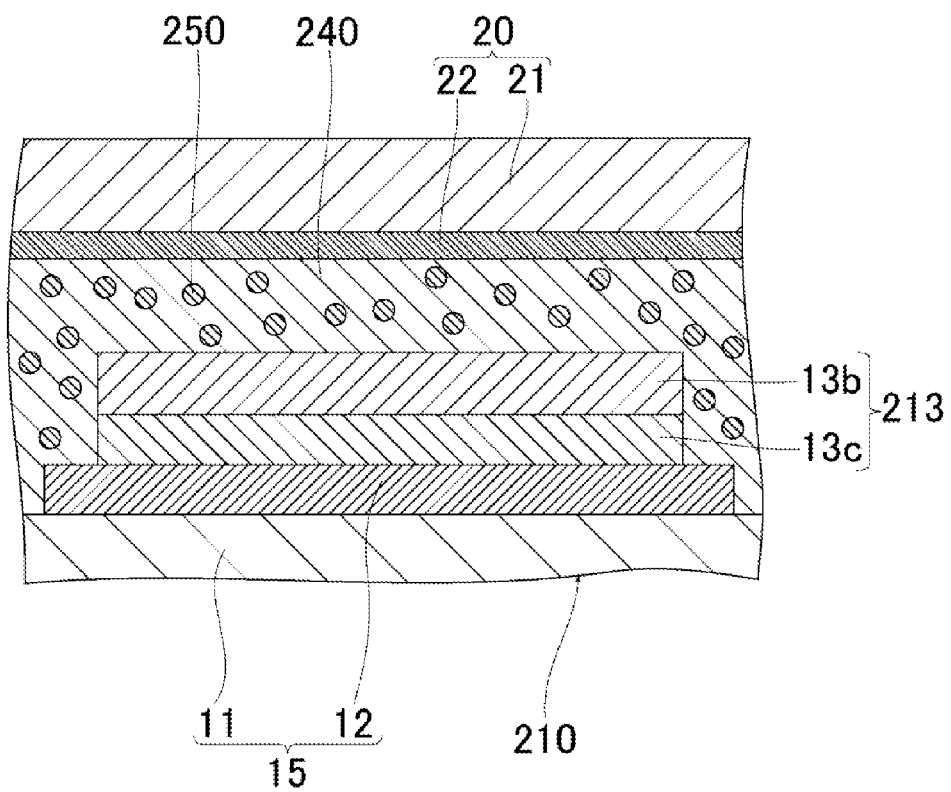
FIG. 4 is a partially enlarged cross-sectional view of FIG. 3.

FIG. 3 is a cross-sectional view illustrating a second embodiment of a dye-sensitized solar cell according to the invention and FIG. 4 is a partially enlarged cross-sectional view of FIG. 3.

As illustrated in FIG. 3 and FIG. 4, a dye-sensitized solar cell 200 of the present embodiment is different from the dye-sensitized solar cell 100 of the first embodiment in that a porous titanium oxide layer 213 is constituted by the first layer 13b and the second layer 13c, and the first layer 13b is disposed at the position closest to the counter electrode 20 among the layers constituting the porous titanium oxide layer 213. In addition, the dye-sensitized solar cell 200 of the present embodiment is different from the dye-sensitized solar cell 100 of the first embodiment in that an electrolyte 240 is constituted by a gel electrolyte containing a rutile crystal-type titanium oxide 250 composed of a rutile crystal as well. Moreover, the dye-sensitized solar cell 200 of the present embodiment is different from the dye-sensitized solar cell 100 of the first embodiment in that the haze ratio of the electrolyte 240 is greater than the haze ratio of the porous titanium oxide layer 213 as well.

According to this dye-sensitized solar cell 200, the light transmitted through the first layer 13b is effectively reflected on the electrolyte 240 and sufficiently returned to the first layer 13b since the haze ratio of the electrolyte 240 is greater than the haze ratio of the porous titanium oxide layer 213. For this reason, the efficiency of light absorption in the porous titanium oxide layer 13 increases more compared to a case in which the haze ratio of the electrolyte 240 is equal to or less than the haze ratio of the porous titanium oxide layer 213, and thus it is possible to more improve the photoelectric conversion characteristics of the dye-sensitized solar cell 200.

In addition, in the dye-sensitized solar cell 200, the electrolyte 240 is constituted by a gel electrolyte containing a rutile crystal-type titanium oxide 250 composed of a rutile crystal. For this reason, it is possible to more sufficiently scatter light and the efficiency of light absorption in the porous titanium oxide layer 213 increases more compared to a case in which the electrolyte 240 does not contain the rutile crystal-type titanium oxide, and thus it is possible to more improve the photoelectric conversion characteristics of the dye-sensitized solar cell 200. In addition, the fluidity of the electrolyte 240 is sufficiently deteriorated since the electrolyte 240 is constituted by a gel electrolyte. For this reason, it is possible to sufficiently suppress that the rutile crystal-type titanium oxide is unevenly distributed in the electrolyte 240 even in a case in which the dye-sensitized solar cell 200 is installed such that the conductive substrate 15 is inclined with respect to the horizontal plane unlike the case in which the electrolyte 240 is liquid, and thus it is possible to evenly reflect the light transmitted through the porous titanium oxide layer 213.

The average particle size of the rutile crystal-type titanium oxide contained in the electrolyte 240 may be set to be the same as the average particle size of the rutile crystal-type titanium oxide in the first layer 13b, for example.

The shape of the rutile crystal-type titanium oxide is not particularly limited, and examples thereof may include a spherical shape and a needle shape, but the shape is preferably a spherical shape in the same manner as the rutile crystal-type titanium oxide in the first layer 13b. In this case, the effect of scattering light incident on the porous titanium oxide layer 213 increases more compared to a case in which the rutile crystal-type titanium oxide has a shape other than the spherical shape, and thus it is possible to more improve the photoelectric conversion characteristics of the dye-sensitized solar cell 200.

The haze ratio of the electrolyte 240 may be greater than the haze ratio of the porous titanium oxide layer 213, but the difference between the haze ratio of the electrolyte 240 and the haze ratio of the porous titanium oxide layer 213 is preferably from 10 to 70%, more preferably from 20 to 70%, and even more preferably from 30 to 50%. It is possible to more improve the photoelectric conversion characteristics of the dye-sensitized solar cell 200 when the difference between the haze ratio of the electrolyte 240 and the haze ratio of the porous titanium oxide layer 213 is within the above respective ranges, compared to the case of being out of the respective ranges.

It is possible to adjust the haze ratio of the electrolyte 240, for example, by changing the material of the rutile crystal-type titanium oxide 250 and the content of the rutile crystal-type titanium oxide 250 in the electrolyte 240. The content of the rutile crystal-type titanium oxide 250 in the electrolyte 240 is preferably from 10 to 90% by mass, more preferably from 20 to 70% by mass, and even more preferably from 30 to 70% by mass. It is possible to more improve the photoelectric conversion characteristics of the dye-sensitized solar cell 200 when the content of the rutile crystal-type titanium oxide 250 in the electrolyte 240 is within the above range, compared to the case of being out of the above range.

Figure 5:
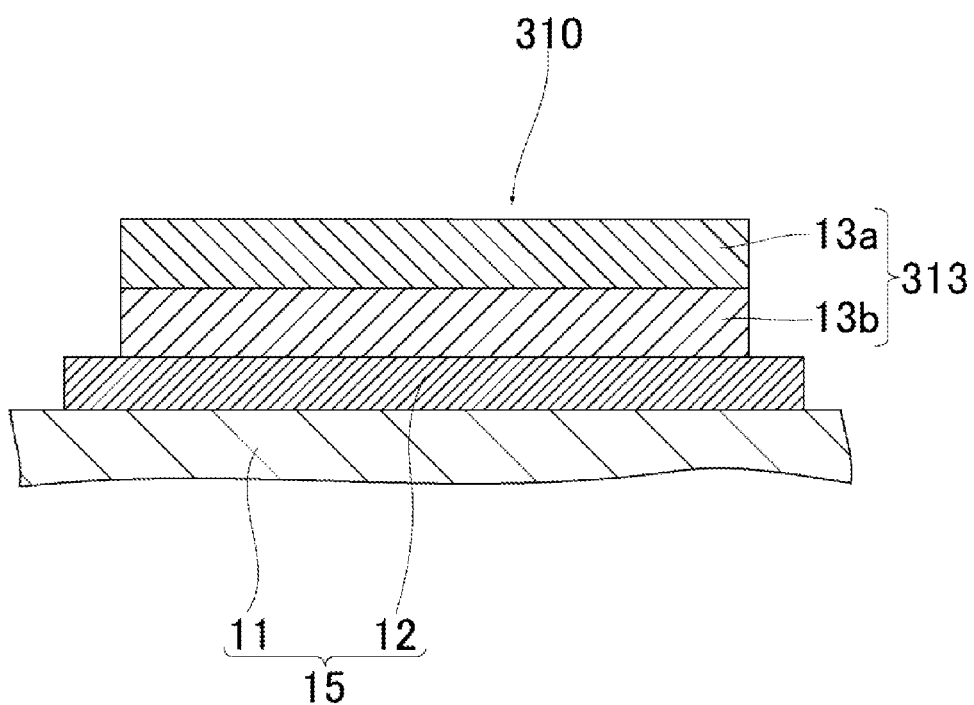
FIG. 5 is a partially enlarged cross-sectional view illustrating a modified example of a working electrode in FIG. 1.

The invention is not limited to the embodiments above. For example, in the first embodiment above, the porous titanium oxide layer 13 has the second layer 13c, but a porous titanium oxide layer 313 may not have the second layer 13c as a working electrode 310 in a dye-sensitized solar cell according to a third embodiment illustrated in FIG. 5. In other words, the porous titanium oxide layer 313 may be constituted by the light reflecting layer 13a and the first layer 13b. In addition, in the second embodiment as well, it is possible to omit the second layer 13c in the porous titanium oxide layer 213. In other words, the porous titanium oxide layer 213 may be constituted by only the first layer 13b.

In addition, in the first and third embodiments above, the porous titanium oxide layers 13 and 313 have the light reflecting layer 13a, but the porous titanium oxide layer 13 is not necessarily required to have the light reflecting layer 13a.

Moreover, in the first and second embodiments above, it is described that the content of the rutile crystal-type titanium oxide in the second layer 13c is smaller than the content of the rutile crystal-type titanium oxide in the first layer 13b, but the content of the rutile crystal-type titanium oxide in the second layer 13c may be equal to or more than the content of the rutile crystal-type titanium oxide in the first layer 13b.

Furthermore, in the first embodiment above, it is described that the content of the rutile crystal-type titanium oxide in the light reflecting layer 13a is greater than the content of the rutile crystal-type titanium oxide in the first layer 13b, but the content of the rutile crystal-type titanium oxide in the light reflecting layer 13a may be equal to or less than the content of the rutile crystal-type titanium oxide in the first layer 13b.

EXAMPLES

Hereinafter, the content of the invention will be described more specifically with reference to Examples, but the invention is not limited to the following Examples.

Example 1

Fabrication of Working Electrode

First, an FTO/glass substrate prepared by forming an FTO film on a glass substrate was prepared. The FTO/glass substrate was then washed, this substrate was subjected to the UV-$O_3$ treatment, and a titanium oxide nanoparticle paste for first layer formation containing titanium oxide was coated on the substrate by screen printing and dried at 150° C. for 10 minutes. At this time, the titanium oxide was constituted by an anatase crystal-type titanium oxide for light absorption (21NR manufactured by JGC Catalysts and Chemicals Ltd.) and a rutile crystal-type titanium oxide for light scatter (titanium oxide (rutile form) manufactured by Junsei Chemical Co., Ltd.). Here, the content of the rutile crystal-type titanium oxide in the titanium oxide was set to be 5% by mass.

Next, a titanium oxide nanoparticle paste for light reflecting layer formation was prepared in the same manner as the titanium oxide nanoparticle paste for first layer formation except that titanium oxide composed of only the rutile crystal-type titanium oxide for light scatter having an average particle size of 180 nm was used as titanium oxide. Thereafter, the titanium oxide nanoparticle paste for light reflecting layer formation was coated on the dried titanium oxide nanoparticle paste for first layer formation by screen printing and dried at 150° C. for 10 minutes.

In this manner, an unfired substrate was obtained. Thereafter, this unfired substrate was introduced into an oven and the titanium oxide nanoparticle paste for first layer formation and the titanium oxide nanoparticle paste for light reflecting layer formation were fired at 500° C. for 1 hour so as to form a porous titanium oxide layer which has a thickness of 14 µm and is constituted by a laminate formed by sequentially laminating a first layer having a thickness of 10 µm and a light reflecting layer having a thickness of 4 µm on an FTO film, and thus the working electrode was obtained. Meanwhile, the working electrode fabricated in the same manner as the above was cut, and the cross sections of the first layer and the light reflecting layer of the cross-section of the working electrode were observed by an SEM, and as a result, the shape of the titanium oxide in the light reflecting layer was spherical and the average particle size thereof was 180 nm. In addition, the shape of any of the titanium oxides in the first layer was spherical, and among the titanium oxides, the particle size of the titanium oxide having a small particle size was from 20 to 25 nm and the particle size of the titanium oxide having a great particle size was from 150 to 210 nm. At this time, the XRD analysis of the titanium oxides in the light reflecting layer and the first layer was performed, and as a result, it was found that the titanium oxide in the light reflecting layer was a rutile crystal-type titanium oxide. In addition, in the first layer, the titanium oxide having a small particle size was an anatase crystal-type titanium oxide and the average particle size thereof was 21 nm. Moreover, it was found that the content of the rutile crystal-type titanium oxide in the light reflecting layer was 100% by mass, the content of the rutile crystal-type titanium oxide in the first layer was 5% by mass, and the content of the rutile crystal-type titanium oxide in the entire porous titanium oxide layer was 32% by mass.

(Supporting of Photosensitizing Dye)

Next, N719 dye that is a photosensitizing dye was dissolved in a mixed solvent prepared by mixing acetonitrile and t-butyl alcohol at 1:1 (volume ratio) to prepare a dye solution. Thereafter, the above working electrode was immersed in this dye solution for 24 hours, and thus the photosensitizing dye was supported on the porous titanium oxide layer.

(Fabrication of Counter Electrode)

Meanwhile, an FTO/glass substrate which had a thickness of 1 mm and was used in the fabrication of the working electrode was prepared, and Pt was deposited on this substrate by a sputtering method. The counter electrode was obtained in this manner.

(Fabrication of Sealing Portion)

Next, an annular thermoplastic resin sheet consisting of Himilan (trade name, manufactured by Du Pont-Mitsui Polychemicals Co., Ltd.) that is an ionomer was disposed on the working electrode. At this time, the porous titanium oxide layer was disposed on the inner side of the annular thermoplastic resin sheet. The thermoplastic resin sheet was then melted by heating at 180° C. for 5 minutes and adhered to the working electrode.

(Disposition of Electrolyte)

On the other hand, a liquid electrolyte composed of an electrolyte component obtained by adding $I_2$, guanidinium thiocyanate, and 1-methylbenzimidazole to a mixture of 1-hexyl-3-methylimidazolium iodide and 3-methoxypropionitrile was prepared. Thereafter, the electrolyte thus prepared was coated on the working electrode by a screen printing method so as to cover the porous titanium oxide layer.

(Sealing)

The counter electrode was superimposed on the working electrode so as to sandwich the electrolyte between the working electrode and the counter electrode, and the sealing portion was melted by heating under reduced pressure (1000 Pa) so as to adhere the counter electrode to the sealing portion. The dye-sensitized solar cell was obtained in this manner.

Example 2

The dye-sensitized solar cell was fabricated in the same manner as in Example 1 except that the content of the anatase crystal-type titanium oxide that is the titanium oxide for light absorption in the first layer was changed from 95% by mass to 97% by mass, the content of the rutile crystal-type titanium oxide that is the titanium oxide for light scatter in the first layer was changed from 5% by mass to 3% by mass, and the content of the rutile crystal-type titanium oxide in the entire porous titanium oxide layer was changed from 32% by mass to 31% by mass as presented in Table 1.

Example 3

The dye-sensitized solar cell was fabricated in the same manner as in Example 1 except that the content of the anatase crystal-type titanium oxide that is the titanium oxide for light absorption in the first layer was changed from 95% by mass to 85% by mass, the content of the rutile crystal-type titanium oxide that is the titanium oxide for light scatter in the first layer was changed from 5% by mass to 15% by mass, and the content of the rutile crystal-type titanium oxide in the entire porous titanium oxide layer was changed from 32% by mass to 40% by mass as presented in Table 1.

Example 4

The dye-sensitized solar cell was fabricated in the same manner as in Example 1 except that the light reflecting layer was not formed on the first layer and the content of the rutile crystal-type titanium oxide in the entire porous titanium oxide layer was changed from 32% by mass to 5% by mass as presented in Table 1.

Example 5

The dye-sensitized solar cell was fabricated in the same manner as in Example 1 except that the average particle size (size of anatase) of the anatase crystal-type titanium oxide that is the titanium oxide for light absorption in the first layer was changed from 21 nm to 15 nm.

Example 6

The dye-sensitized solar cell was fabricated in the same manner as in Example 1 except that the average particle size (size of rutile) of the rutile crystal-type titanium oxide in the first layer was changed from 180 nm to 550 nm as presented in Table 1.

Example 7

The dye-sensitized solar cell was fabricated in the same manner as in Example 1 except that the average particle size of the rutile crystal-type titanium oxide in the first layer was changed from 180 nm to 400 nm, the titanium oxide for light scatter in the light reflecting layer was changed from the rutile crystal-type titanium oxide to the anatase crystal-type titanium oxide, and the content of the rutile crystal-type titanium oxide in the entire porous titanium oxide layer was changed from 32% by mass to 5% by mass as presented in Table 1.

Example 8

The dye-sensitized solar cell was fabricated in the same manner as in Example 1 except that the light reflecting layer was not formed on the first layer, but instead, the electrolyte was changed from a liquid to a gel electrolyte using only the rutile crystal-type titanium oxide as the titanium oxide for light scatter, and the content of the rutile crystal-type titanium oxide in the entire porous titanium oxide layer was changed from 32% by mass to 5% by mass as presented in Table 1. Meanwhile, the gel electrolyte was prepared in the following manner.

In other words, the electrolyte component of Example 1 was prepared, nanoparticles composed of rutile crystal-type titanium oxide having an average particle size of 180 nm were added to this electrolyte component. At this time, the nanoparticles of rutile crystal-type titanium oxide were added so as to have a proportion of 4% by mass when the total mass proportion of the electrolyte component and the nanoparticles was set to 100% by mass. Thereafter, the gelation was performed by sequentially performing the centrifugal treatment and the kneading treatment, thereby obtaining the gel electrolyte. As a result of sequentially performing the centrifugal treatment and the kneading treatment, the nanoparticles of rutile crystal-type titanium oxide had a proportion of 80% by mass when the mass proportion of the entire electrolyte was set to 100% by mass.

Example 9

The dye-sensitized solar cell was fabricated in the same manner as in Example 1 except that the light reflecting layer was not formed on the first layer, but instead, the electrolyte was changed from a liquid to a gel electrolyte using only the anatase crystal-type titanium oxide as the titanium oxide for light scatter, and the content of the rutile crystal-type titanium oxide in the entire porous titanium oxide layer was changed from 32% by mass to 5% by mass as presented in Table 1. Meanwhile, a gel electrolyte prepared in the same manner as in Example 8 except that the rutile crystal-type titanium oxide was changed to the anatase crystal-type titanium oxide was used as the gel electrolyte.

Example 10

The dye-sensitized solar cell was fabricated in the same manner as in Example 1 except that the size of the anatase crystal-type titanium oxide that is the titanium oxide for light absorption in the first layer was changed from the average particle size of 21 nm to the average particle size of 40 nm.

Example 11

The dye-sensitized solar cell was fabricated in the same manner as in Example 1 except that the size of the rutile crystal-type titanium oxide in the first layer was changed from the average particle size of 180 nm to the average particle size of 40 nm as presented in Table 1.

Example 12

The dye-sensitized solar cell was fabricated in the same manner as in Example 1 except that the size of the rutile crystal-type titanium oxide in the first layer was changed from the average particle size of 180 nm to the average particle size of 100 nm as presented in Table 1.

Comparative Example 1

The dye-sensitized solar cell was fabricated in the same manner as in Example 1 except that the light reflecting layer was not formed on the first layer, the content of the anatase crystal-type titanium oxide that is the titanium oxide for light absorption in the first layer was changed from 95% by mass to 100% by mass, the content of the rutile crystal-type titanium oxide that is the titanium oxide for light scatter in the first layer was changed from 5% by mass to 0% by mass, and the content of the rutile crystal-type titanium oxide in the entire porous titanium oxide layer was changed from 32% by mass to 0% by mass as presented in Table 1.

Comparative Example 2

The dye-sensitized solar cell was fabricated in the same manner as in Example 1 except that the light reflecting layer was not formed on the first layer, the content of the anatase crystal-type titanium oxide that is the titanium oxide for light absorption in the first layer was changed from 95% by mass to 80% by mass, the content of the rutile crystal-type titanium oxide that is the titanium oxide for light scatter in the first layer was changed from 5% by mass to 20% by mass, and the content of the rutile crystal-type titanium oxide in the entire porous titanium oxide layer was changed from 32% by mass to 20% by mass as presented in Table 1.

Comparative Example 3

The dye-sensitized solar cell was fabricated in the same manner as in Example 1 except that the light reflecting layer was not formed on the first layer, the content of the anatase crystal-type titanium oxide that is the titanium oxide for light absorption in the first layer was changed from 95% by mass to 99% by mass, the content of the rutile crystal-type titanium oxide that is the titanium oxide for light scatter in the first layer was changed from 5% by mass to 1% by mass, and the content of the rutile crystal-type titanium oxide in the entire porous titanium oxide layer was changed from 32% by mass to 1% by mass as presented in Table 1.

Comparative Example 4

The dye-sensitized solar cell was fabricated in the same manner as in Example 1 except that the light reflecting layer was not formed on the first layer, the titanium oxide for light scatter in the first layer was changed from the rutile crystal-type titanium oxide to the anatase crystal-type titanium oxide, and the content of the rutile crystal-type titanium oxide in the entire porous titanium oxide layer was changed from 32% by mass to 0% by mass as presented in Table 1.

Comparative Example 5

The dye-sensitized solar cell was fabricated in the same manner as in Example 1 except that the light reflecting layer was not formed on the first layer, the shape of the rutile crystal-type titanium oxide that is the titanium oxide for light scatter in the first layer was changed from the spherical shape to the needle shape having an average diameter of 30 nm and an average length of 70 nm, and the content of the rutile crystal-type titanium oxide in the entire porous titanium oxide layer was changed from 32% by mass to 5% by mass as presented in Table 1.

Example 13

The dye-sensitized solar cell was fabricated in the same manner as in Example 1 except that the photosensitizing dye was changed from N719 to N749, the content of the rutile crystal-type titanium oxide in the entire porous titanium oxide layer was changed from 32% by mass to 21% by mass, the thickness of the first layer was changed from 10 μm to 21 μm, and also the solvent of the dye solution was changed from a mixed solvent of acetonitrile and t-butyl alcohol to 1-propanol as presented in Table 2.

Example 14

The dye-sensitized solar cell was fabricated in the same manner as in Example 1 except that the light reflecting layer was not formed on the first layer, the photosensitizing dye was changed from N719 to N749, the content of the rutile crystal-type titanium oxide in the entire porous titanium oxide layer was changed from 32% by mass to 4.2% by mass, and also the solvent of the dye solution was changed from a mixed solvent of acetonitrile and t-butyl alcohol to 1-propanol as presented in Table 2.

Example 15

The dye-sensitized solar cell was fabricated in the same manner as in Example 1 except that the light reflecting layer was not formed on the first layer, but instead, the electrolyte was changed from a liquid to a gel electrolyte using only the rutile crystal-type titanium oxide as the titanium oxide for light scatter, the photosensitizing dye was changed from N719 to N749, the content of the rutile crystal-type titanium oxide in the entire porous titanium oxide layer was changed from 32% by mass to 4.2% by mass, the thickness of the first layer was changed from 10 μm to 21 μm, and also the solvent of the dye solution was changed from a mixed solvent of acetonitrile and t-butyl alcohol to 1-propanol as presented in Table 2. Meanwhile, the same gel electrolyte as that of Example 8 was used as the gel electrolyte.

Comparative Example 6

The dye-sensitized solar cell was fabricated in the same manner as in Example 1 except that the light reflecting layer was not formed on the first layer, the photosensitizing dye was changed from N719 to N749, the content of the anatase crystal-type titanium oxide that is the titanium oxide for light absorption in the first layer was changed from 95% by mass to 100% by mass, the content of the rutile crystal-type titanium oxide that is the titanium oxide for light scatter in the first layer was changed from 5% by mass to 0% by mass, the content of the rutile crystal-type titanium oxide in the entire porous titanium oxide layer was changed from 32% by mass to 0% by mass, the thickness of the first layer was changed from 10 μm to 21 μm, and also the solvent of the dye solution was changed from a mixed solvent of acetonitrile and t-butyl alcohol to 1-propanol as presented in Table 2.

Comparative Example 7

The dye-sensitized solar cell was fabricated in the same manner as in Example 1 except that the light reflecting layer was not formed on the first layer, the photosensitizing dye was changed from N719 to N749, the titanium oxide for light scatter in the first layer was changed from the rutile crystal-type titanium oxide to the anatase crystal-type titanium oxide, the content of the rutile crystal-type titanium oxide in the entire porous titanium oxide layer was changed from 32% by mass to 0% by mass, the thickness of the first layer was changed from 10 μm to 21 μm, and also the solvent of the dye solution was changed from a mixed solvent of acetonitrile and t-butyl alcohol to 1-propanol as presented in Table 2.

Comparative Example 8

The dye-sensitized solar cell was fabricated in the same manner as in Example 1 except that the photosensitizing dye was changed from N719 to N749, the shape of the rutile crystal-type titanium oxide that is the titanium oxide for light scatter in the first layer was changed from the spherical shape to the needle shape having an average diameter of 30 nm and an average length of 70 nm, the content of the rutile crystal-type titanium oxide in the entire porous titanium oxide layer was changed from 32% by mass to 21% by mass, the thickness of the first layer was changed from 10 μm to 21 μm, and also the solvent of the dye solution was changed from a mixed solvent of acetonitrile and t-butyl alcohol to 1-propanol as presented in Table 2.

Meanwhile, in Examples and Comparative Examples except Comparative Example 5 and Comparative Example 8 in Table 1 and Table 2, the "size of rutile" in the first layer means the "average particle size" of the rutile crystal-type titanium oxide. In addition, the "size of anatase" in the first layer means the "average particle size" of the anatase crystal-type titanium oxide.

[Characteristic Evaluation]

The photoelectric conversion characteristics and the light trapping effect were evaluated for the dye-sensitized solar cells of Examples 1 to 15 and Comparative Examples 1 to 8 obtained as described above.

(1) Photoelectric Conversion Characteristic

The photoelectric conversion efficiency η (%) was measured for the dye-sensitized solar cells of Examples 1 to 12 and Comparative Examples 1 to 5 among the dye-sensitized solar cells of Examples 1 to 15 and Comparative Examples 1 to 8 obtained as described above. Thereafter, the rate of increase in photoelectric conversion efficiency η was calculated based on the following Equation by taking Comparative Example 1 as the reference. The results are presented in Table 1.

Rate of increase in photoelectric conversion efficiency (%)=100×(photoelectric conversion efficiency of Examples or Comparative Examples−photoelectric conversion efficiency of Comparative Example 1)/photoelectric conversion efficiency of Comparative Example 1

At this time, the measurement of the photoelectric conversion efficiency was performed using a Xe lamp solar simulator (YSS-150 manufactured by YAMASHITA DENSO CORPORATION) and the I-V tester (MP-160 manufactured by EKO Instruments).

In addition, the photoelectric conversion efficiency η (%) was measured also for the dye-sensitized solar cells of Examples 13 to 15 and Comparative Examples 6 to 8 having a different photosensitizing dye from Examples 1 to 12 and Comparative Examples 1 to 5. Thereafter, the rate of increase in photoelectric conversion efficiency η was calculated based on the following Equation by taking Comparative Example 6 as the reference. The results are presented in Table 2.

Rate of increase in photoelectric conversion efficiency (%)=100×(photoelectric conversion efficiency of Examples or Comparative Examples−photoelectric conversion efficiency of Comparative Example 6)/photoelectric conversion efficiency of Comparative Example 6

(2) Light Trapping Effect

The haze ratio was taken as the indicator for the light trapping effect. The haze ratio of the dye-sensitized solar cell of Examples 1 to 15 and Comparative Examples 1 to 8 obtained as described above was then measured using a haze meter (HM-150 manufactured by MURAKAMI COLOR RESEARCH LABORATORY Co., Ltd.). The results are presented in Tables 1 and 2. Meanwhile, the haze ratio of Examples 6 and 7 in Table 1 is a haze ratio of the dye-sensitized solar cell but also represents the haze ratio of the gel electrolyte. In addition, the haze ratio of the porous titanium oxide layer in the dye sensitized solar cells of Examples 6 and 7 is the same as the haze ratio of the dye-sensitized solar cell obtained by removing titanium oxide for light scatter from the gel electrolyte, namely, the haze ratio of Example 4, and the value thereof is 76%. In addition, the haze ratio of Example 15 in Table 2 is a haze ratio of the dye-sensitized solar cell but also represents the haze ratio of the gel electrolyte. In addition, the haze ratio of the porous titanium oxide layer in the dye sensitized solar cell of Example 15 is the same as the haze ratio of the dye-sensitized solar cell obtained by removing titanium oxide for light scatter from the gel electrolyte, namely, the haze ratio of Example 14, and the value thereof is 89%.

TABLE 1

| | | First layer (rutile crystal-containing layer) | | | | | | |
|---|---|---|---|---|---|---|---|---|
| | | Titanium oxide for light absorption | Titanium oxide for light scatter | | | Size | Size | |
| | Photo-sensitizing dye | Content of anatase (% by mass) | Content of anatase (% by mass) | Content of rutile (% by mass) | Shape of rutile | of anatase (nm) | of rutile (nm) | Thickness (μm) |
| Example 1 | N719 | 95 | — | 5 | Spherical | 21 | 180 | 10 |
| Example 2 | N719 | 97 | — | 3 | Spherical | 21 | 180 | 10 |

TABLE 1-continued

| | Photo-sensitizing dye | Content of anatase (% by mass) | | Content of rutile (% by mass) | Shape of rutile | Size of Anatase (nm) | Size of rutile (nm) | Thickness (μm) |
|---|---|---|---|---|---|---|---|---|
| Example 3 | N719 | 85 | — | 15 | Spherical | 21 | 180 | 10 |
| Example 4 | N719 | 95 | — | 5 | Spherical | 21 | 180 | 10 |
| Example 5 | N719 | 95 | — | 5 | Spherical | 15 | 180 | 10 |
| Example 6 | N719 | 95 | — | 5 | Spherical | 21 | 550 | 10 |
| Example 7 | N719 | 95 | — | 5 | Spherical | 21 | 400 | 10 |
| Example 8 | N719 | 95 | — | 5 | Spherical | 21 | 180 | 10 |
| Example 9 | N719 | 95 | — | 5 | Spherical | 21 | 180 | 10 |
| Example 10 | N719 | 95 | — | 5 | Spherical | 40 | 180 | 10 |
| Example 12 | N719 | 95 | — | 5 | Spherical | 21 | 100 | 10 |
| Comparative Example 1 | N719 | 100 | — | — | Spherical | 21 | — | 10 |
| Comparative Example 2 | N719 | 80 | — | 20 | Spherical | 21 | 180 | 10 |
| Comparative Example 3 | N719 | 99 | — | 1 | Spherical | 21 | — | 10 |
| Comparative Example 4 | N719 | 95 | — | 5 | Spherical | 21 | — | 10 |
| Comparative Example 5 | N719 | 95 | — | — | Needle-like | 21 | Diameter: 30 Length: 70 | 10 |

| | Light reflection layer | | | Electrolyte | | | Characteristic evaluation | |
|---|---|---|---|---|---|---|---|---|
| | Titanium oxide for light scatter | | | Titanium oxide for light scatter | | | Rate of increase in photoelectric | |
| | Content of anatase (% by mass) | Content of rutile (% by mass) | Thickness (μm) | Content of anatase (% by mass) | Content of rutile (% by mass) | Kind | Content of rutile in porous titanium oxide layer (% by mass) | conversion efficiency (%) Comparative Example 6 is reference) | Haze ratio (%) |
| Example 1 | — | 100 | 4 | — | — | Liquid | 32 | 54 | 96 |
| Example 2 | — | 100 | 4 | — | — | Liquid | 31 | 52 | 96 |
| Example 3 | — | 100 | 4 | — | — | Liquid | 40 | 43 | 96 |
| Example 4 | — | — | — | — | — | Liquid | 5 | 32 | 76 |
| Example 5 | — | 100 | 4 | — | — | Liquid | 32 | 49 | 96 |
| Example 6 | — | 100 | 4 | — | — | Liquid | 32 | 42 | 96 |
| Example 7 | 100 | — | 4 | — | — | Liquid | 5 | 50 | 96 |
| Example 8 | — | — | — | — | 100 | Gel | 5 | 56 | 96 |
| Example 9 | — | — | — | 100 | — | Gel | 5 | 54 | 96 |
| Example 10 | — | 100 | 4 | — | — | Liquid | 32 | 31 | 96 |
| Example 12 | — | 100 | 4 | — | — | Liquid | 32 | 42 | 96 |
| Comparative Example 1 | — | — | — | — | — | Liquid | 0 | 0 | 50 |
| Comparative Example 2 | — | — | — | — | — | Liquid | 20 | 25 | 87 |
| Comparative Example 3 | — | — | — | — | — | Liquid | 1 | 20 | 56 |
| Comparative Example 4 | — | — | — | — | — | Liquid | 0 | 24 | 75 |
| Comparative Example 5 | — | — | — | — | — | Liquid | 5 | 20 | 76 |

TABLE 2

| | First layer (rutile crystal-containing layer) | | | | | | | Light reflection layer | | |
|---|---|---|---|---|---|---|---|---|---|---|
| | | Titanium oxide for light scatter | | | | | | Titanium oxide for light scatter | | |
| | Titanium oxide for light absorption Content of anatase (% by mass) | Content of anatase (% by mass) | Content of rutile (% by mass) | Shape of rutile | Size of Anatase (nm) | Size of rutile (nm) | Thickness (μm) | Content of anatase (% by mass) | Content of rutile (% by mass) | Thickness (μm) |
| | Photo-sensitizing dye | | | | | | | | | |
| Example 13 | N749 | 95 | — | 5 | Spherical | 21 | 180 | 21 | — | 100 | 4 |
| Example 14 | N749 | 95 | — | 5 | Spherical | 21 | 180 | 21 | — | — | — |

TABLE 2-continued

| | | | | | Shape | | | | | | |
|---|---|---|---|---|---|---|---|---|---|---|---|
| Example 15 | N749 | 95 | — | 5 | Spherical | 21 | 180 | 21 | — | — | — |
| Comparative Example 6 | N749 | 100 | — | — | Spherical | 21 | — | 21 | — | — | — |
| Comparative Example 7 | N749 | 95 | 5 | — | Spherical | 21 | — | 21 | — | — | — |
| Comparative Example 8 | N749 | 95 | — | 5 | Needle-like | 21 | Diameter: 30 Length: 70 | 21 | — | 100 | 4 |

| | Electrolyte | | | Content of rutile in porous titanium oxide layer (% by mass) | Characteristic evaluation | |
|---|---|---|---|---|---|---|
| | Titanium oxide for light scatter | | | | Rate of increase in photoelectric conversion efficiency (%) Comparative Example 6 is reference) | Haze ratio (%) |
| | Content of anatase (% by mass) | Content of rutile (% by mass) | Kind | | | |
| Example 13 | — | — | Liquid | 21 | 49 | 97 |
| Example 14 | — | — | Liquid | 4.2 | 26 | 89 |
| Example 15 | — | 100 | Gel | 4.2 | 51 | 96 |
| Comparative Example 6 | — | — | Liquid | 0 | 0 | 63 |
| Comparative Example 7 | — | — | Liquid | 0 | 20 | 86 |
| Comparative Example 8 | — | — | Liquid | 21 | 20 | 91 |

From the results presented in Table 1, it was found that in the dye-sensitized solar cells of Examples 1 to 12, the rate of increase in photoelectric conversion efficiency calculated by taking Comparative Example 1 as the reference was greater than that of the dye-sensitized solar cells of Comparative Examples 1 to 5.

Meanwhile, a high haze ratio was obtained in any of Examples 1 to 15.

From the results presented in Table 2, it was found that in the dye-sensitized solar cells of Examples 13 to 15, the rate of increase in photoelectric conversion efficiency calculated by taking Comparative Example 6 as the reference was greater than that of the dye-sensitized solar cells of Comparative Examples 6 to 8.

Meanwhile, a high haze ratio was obtained in any of Examples 13 to 15.

Based on the above, it was confirmed that the photoelectric conversion characteristics can be improved according to the dye-sensitized solar cell of the invention.

EXPLANATIONS OF REFERENCE NUMERALS

10 and 310 . . . working electrode
13, 213, and 313 . . . porous titanium oxide layer
13a . . . light reflecting layer
13b . . . first layer (rutile crystal-containing layer)
13c . . . second layer
15 . . . conductive substrate
20 . . . counter electrode
40 and 240 . . . electrolyte
100 and 200 . . . dye-sensitized solar cell

The invention claimed is:

1. A dye-sensitized solar cell comprising:
a working electrode having a porous titanium oxide layer on a conductive substrate capable of transmitting light;
a counter electrode disposed so as to face the working electrode;
a photosensitizing dye supported on the porous titanium oxide layer of the working electrode; and
an electrolyte disposed between the working electrode and the counter electrode,
wherein the porous titanium oxide layer includes a rutile crystal-containing layer containing an anatase crystal-type titanium oxide and a rutile crystal-type titanium oxide, the rutile crystal-type titanium oxide being spherical,
a content of the rutile crystal-type titanium oxide of the anatase crystal-type titanium oxide and the rutile crystal-type titanium oxide in the rutile crystal-containing layer is from 3 to 15% by mass,
an average particle size of the anatase crystal-type titanium oxide in the rutile crystal-containing layer is from 15 to 40 nm, and
an average particle size of the rutile crystal-type titanium oxide in the rutile crystal-containing layer is from 180 to 550 nm.

2. The dye-sensitized solar cell according to claim 1, wherein the porous titanium oxide layer has a first layer and a second layer provided on a conductive substrate side with respect to the first layer,
the first layer is constituted by the rutile crystal-containing layer, and
a content of the rutile crystal-type titanium oxide in the second layer is smaller than a content of the rutile crystal-type titanium oxide in the first layer.

3. The dye-sensitized solar cell according to claim 1, wherein the porous titanium oxide layer further has a light reflecting layer to reflect light emitted from the rutile crystal-containing layer on a side opposite to the conductive substrate with respect to the rutile crystal-containing layer.

4. The dye-sensitized solar cell according to claim 3, wherein the light reflecting layer includes a rutile crystal-type titanium oxide.

5. The dye-sensitized solar cell according to claim 1, wherein the rutile crystal-containing layer is disposed at a position closest to the counter electrode in the porous titanium oxide layer, the electrolyte is constituted by a gel electrolyte containing a rutile crystal-type titanium oxide, and a haze ratio of the electrolyte is greater than a haze ratio of the porous titanium oxide layer.

* * * * *